Oct. 7, 1952　　　　　　　A. A. KRUZE　　　　　　　2,612,712
FISHING APPARATUS
Filed Oct. 13, 1947　　　　　　　　　　　　　　　2 SHEETS—SHEET 1
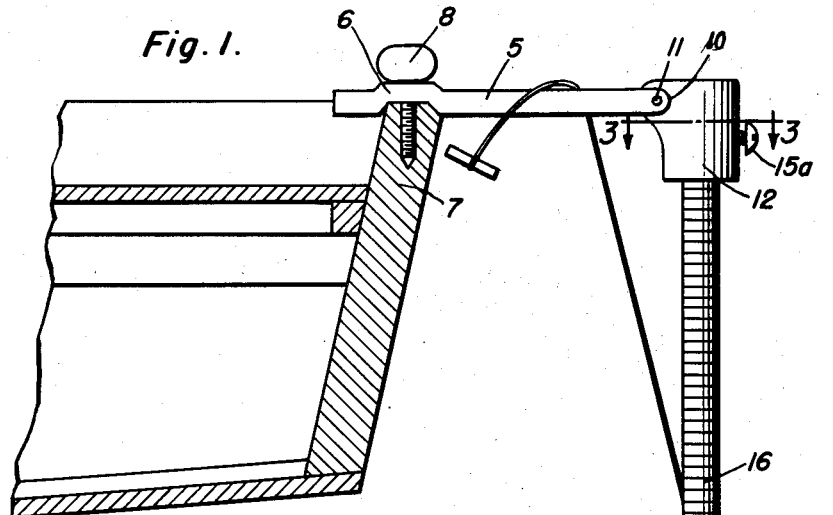
Fig. 1.
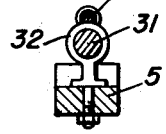
Fig. 8.
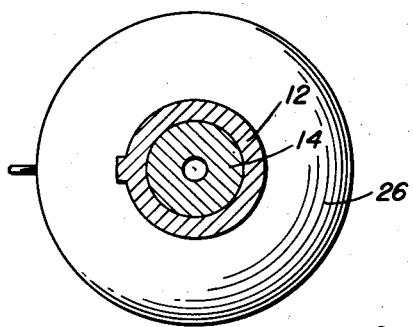
Fig. 3.
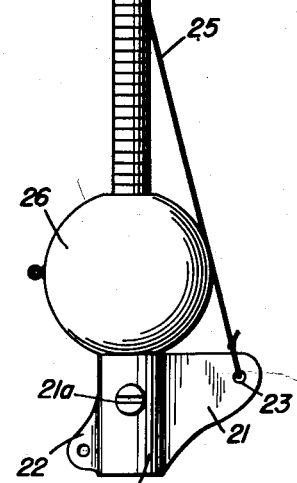
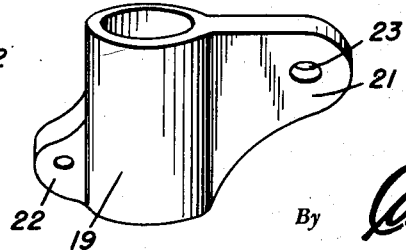
Fig. 4.
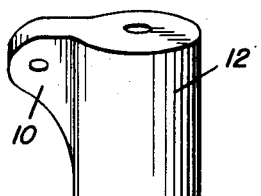
Fig. 5.　　Fig. 6.
Inventor
Andrew A. Kruze
By Clarence A. O'Brien
and Harvey B. Jacobson
Attorneys Oct. 7, 1952 A. A. KRUZE 2,612,712
FISHING APPARATUS
Filed Oct. 13, 1947 2 SHEETS—SHEET 2
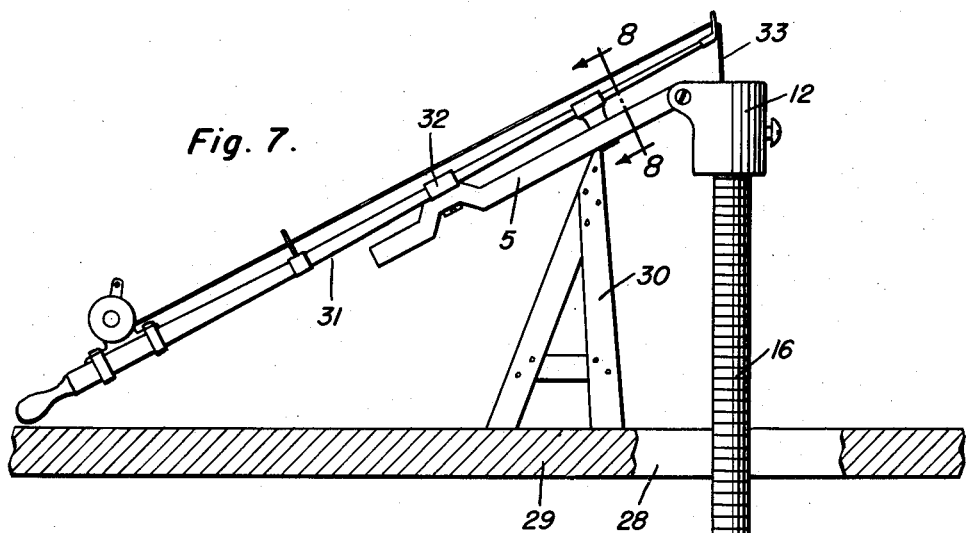
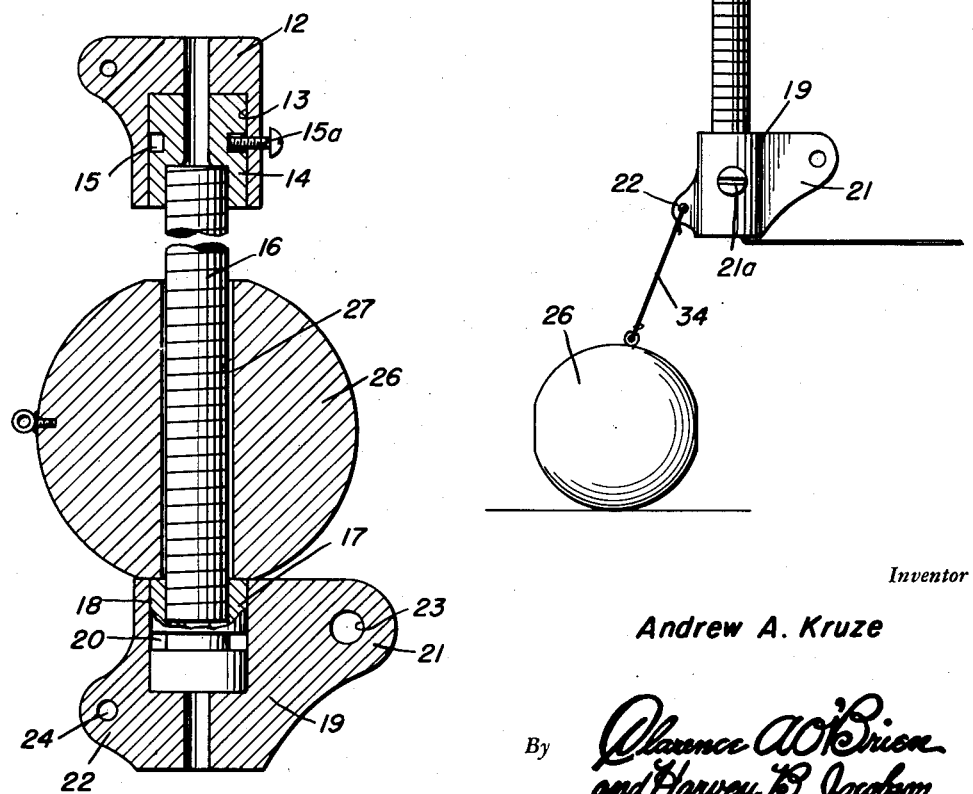
Inventor
Andrew A. Kruze Patented Oct. 7, 1952

2,612,712

UNITED STATES PATENT OFFICE 2,612,712

FISHING APPARATUS

Andrew A. Kruze, Detroit, Mich.

Application October 13, 1947, Serial No. 779,459

3 Claims. (Cl. 43—4)

1

The present invention relates to new and useful improvements in fishing apparatus or equipment designed for use with fishing lines, and more particularly to means for holding the lower end of a fishing line in a position where the line will extend substantially horizontally below the surface of the water by the action of the current of a stream or by the movement of a boat to which the apparatus is attached.

An important object of the invention is to provide a vertically disposed line guide which projects downwardly a substantial distance below the surface of the water and through which the fishing line may be reeled in or paid out and arranged whereby the lower end of the fishing line may be maintained at a substantially uniform depth while trolling and to avoid entanglement of the line with weeds floating on the surface of the water.

A further object of the invention is to provide a fishing apparatus of this character which may be used for ice fishing as well as for attaching the same to a boat.

A still further object is to provide an apparatus of this character of simple and practical construction, which is efficient and reliable in operation, which may be easily and quickly attached in position for fishing from a boat or from a hole in ice, and which otherwise is well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view showing the device attached to a boat and with parts broken away and shown in section;

Figure 2 is an enlarged vertical sectional view;

Figure 3 is an enlarged sectional view taken on a line 3—3 of Figure 1;

Figure 4 is a perspective view of the attaching arm for the upper end of the device;

Figure 5 is a perspective view of the pivotal connector for the upper end of the line guide tube;

Figure 6 is a perspective view of the fitting at the lower end of the line guide tube for attaching a lifting cord thereto;

Figure 7 is a side elevational view illustrating the device in use for fishing thru a hole in the ice; and Figure 8 is a sectional view taken on a line 8—8 of Figure 7.

2

Referring now to the drawings in detail, the numeral 5 designates a supporting arm having an offset portion 6 for seating on the upper edge of a gunwale 7 of a boat and secured in a horizontal, outwardly projecting position thereon by a screw or the like 8.

The outer end of the arm 5 is bifurcated, as shown at 9 and an apertured ear 10 is positioned and pivoted thereto by means of a pin 11. The ear 10 is formed at one side of a cylindrical line guide 12 which is positioned vertically and formed in its lower portion with a cylindrical recess 13 having a coupling 14 rotatably positioned therein. The coupling is provided with an annular external groove 15 in which the inner end of a set screw 15a carried by the line guide 12 projects to hold the coupling in the lower end of the line guide.

A flexible metal tube 16 has its lower end secured in the coupling 14 and extends downwardly therefrom and is provided at its lower end with a similar coupling 17. The coupling 17 is rotatably mounted in a cylindrical recess 18 in the upper end of a lower line guide 19, the coupling 17 also being formed with an external annular groove 20 receiving a set screw 21a carried by a lower line guide 19 to retain the lower guide in the recess 18.

The lower line guide 19 is formed at diametrically opposite sides with horizontally projecting ears 21 and 22 having openings 23 and 24 respectively therein.

A lifting cord or rope 25 has its lower end attached in the opening 23 and extends upwardly into a position within reach by an occupant of the boat to swing the tube 16 upwardly on the pivot 11, when desired.

A weight or sinker 26 is provided with a bore 27 extending therethrough for slidably mounting on the tube 16 whereby the weight will normally ride downwardly on the tube for resting on the lower line guide 19, as shown in Figure 1 of the drawings.

In the operation of the device, and with the parts thereof assembled in the manner as shown in Figure 1 of the drawings, the arm 5 is attached to the gunwale 7 of a boat so as to support the tube 16 in a perpendicular position outwardly at one side of the boat and with the lower guide 19 substantially below the surface of the water.

A fishing line (not shown) is inserted through the upper line guide 12, tube 16 and lower line guide 19 to extend below the lower line guide whereby, as the boat 7 moves forwardly, the lower end of the line will be pulled through the water in substantially a horizontal position below the surface of the water.

When a fish is caught, the line is pulled upwardly through the tube 16 as far as possible, and the pull cord is then raised to flex the tube and lift the lower end of the tube 16 upwardly to bring the lower end of the tube and lower line guide into a position for conveniently removing the fish from the line.

In Figures 7 and 8, I have illustrated the use of the invention for fishing through a hole 28 in ice 29 and with the tube 16 extending perpendicularly through the hole.

The arm 5 is supported on a suitable trestle 30 to hold the upper line guide 12 in a raised position and the arm 5 may be attached to a fishing pole 31 by conventional clamps 32 and in a position so the fishing line 33 will extend downwardly through the tube 16 and through the lower line guide 19.

If desired, the weight or sinker 26 may be removed from the tube 16 and attached to the opening 24 in the ear 22 by a line 34 so that the sinker will rest on the bottom of the stream.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fishing apparatus comprising a flexible tubular line guide, a supporting member adapted to be secured to a supporting structure, means attached to one end of the guide and pivotally secured to the member for connecting the member and guide, a socket member attached to the other end of the guide and having an outwardly projecting ear, a sinker having a cylindrical bore receiving the guide, said sinker resting upon the socket member to retain the guide extended and straight, and an actuating cord attached to the ear adapted to be manually actuated for flexing the guide.

2. A fishing line guide attachment for boats, said attachment comprising a flexible tube having upper and lower ends, a cylindrical line guide having a socket in which the upper end of said tube is secured, a second cylindrical line guide having a socket in which the lower end of said tube is secured, a support member pivoted to the first named line guide, a sinker supported by said second line guide at the lower end of said tube for retaining the tube extended and straight, said sinker having a smooth surfaced cylindrical bore receiving the tube, and an operating cord attached to said second line guide adapted to be manually pulled for flexing the tube to raise the lower end of the tube.

3. A fishing line guide comprising an elongated support member having a means at one end for securing the same to a supporting structure, a flexible tube having upper and lower ends, an upper cylindrical line guide having a socket in which the upper end of said tube is secured, an ear forming part of the upper guide pivoted to the other end of the base member, a lower line guide having a socket in which the lower end of the tube is secured, and a weight supported by the lower line guide retaining the tube extended and straight.

ANDREW A. KRUZE.

REFERENCES CITED

The following references are of record in the file of this patent:

UNITED STATES PATENTS

| Number | Name | Date |
|---|---|---|
| 683,361 | Watson | Sept. 24, 1901 |
| 1,010,559 | Williamson | Dec. 5, 1911 |
| 1,051,992 | Fisher et al. | Feb. 4, 1913 |
| 1,253,746 | Teeling | Jan. 15, 1918 |
| 1,475,408 | Reed | Nov. 27, 1923 |
| 1,586,300 | Fields | May 25, 1926 |
| 2,204,560 | Allison | June 18, 1940 |
| 2,493,971 | Johnson | Jan. 10, 1950 |
| 2,523,592 | Powell et al. | Sept. 26, 1950 |

FOREIGN PATENTS

| Number | Country | Date |
|---|---|---|
| 6,449 | Norway | July 25, 1898 |